(12) United States Patent
Mayet

(10) Patent No.: US 6,641,690 B2
(45) Date of Patent: Nov. 4, 2003

(54) APPARATUS WITH A COMBINATION OF MOVEMENTS FOR MANUFACTURING A TIRE REINFORCEMENT FROM A SINGLE CORD

(75) Inventor: Jean-Claude Mayet, Clermont-Ferrand (FR)

(73) Assignee: Sedepro, Paris (FR)

( * ) Notice: Subject to any disclaimer, the term of this patent is extended or adjusted under 35 U.S.C. 154(b) by 0 days.

(21) Appl. No.: 09/773,992

(22) Filed: Feb. 1, 2001

(65) Prior Publication Data

US 2001/0023736 A1 Sep. 27, 2001

(30) Foreign Application Priority Data

Feb. 1, 2000 (FR) .............................. 00 01395

(51) Int. Cl.[7] .............................................. B29D 30/16
(52) U.S. Cl. ...................................... 156/117; 156/397
(58) Field of Search .................... 156/397, 117, 156/121, 133, 130.7, 135, 123, 398, 405.1, 408, 173, 175; 152/548, 560, 562, 559, 561

(56) References Cited

U.S. PATENT DOCUMENTS

| | | | |
|---|---|---|---|
| 1,259,997 A | * | 3/1918 | Kline ......................... 156/397 |
| 3,082,140 A | | 3/1963 | Vanzo |
| 3,761,341 A | | 9/1973 | Kimble |
| 4,830,781 A | | 5/1989 | Oswald |
| 5,174,939 A | | 12/1992 | Siegenthaler |
| 5,453,140 A | | 9/1995 | Laurent et al. |
| 5,616,209 A | | 4/1997 | Laurent et al. |
| 6,059,910 A | | 5/2000 | Siegenthaler |

FOREIGN PATENT DOCUMENTS

| | | |
|---|---|---|
| AI | 390762 | 6/1990 |
| EP | 0962304 | 12/1999 |
| GB | 848962 | 9/1960 |

* cited by examiner

*Primary Examiner*—Geoffrey L. Knable
(74) *Attorney, Agent, or Firm*—Baker Botts L.L.P.

(57) ABSTRACT

An apparatus for manufacturing a tire reinforcement from a cord, cooperating with a substantially toroidal form on which arches of the cord are deposited according to a desired trajectory for the cord on the surface of the form, the apparatus having depositing members arranged on a support, the depositing members including a guide member in which the cord may slide freely, a mechanism for actuating the guide member in a cyclical, to-and-fro, movement, to bring the guide member in successive oscillations into the vicinity of each of the desired ends for the cord in the trajectory. The apparatus further includes a first motor imparting the desired movements to the actuating mechanism and a second motor for imparting to the depositing member support a cyclical movement synchronized with the actuating mechanism, allowing deflection of the final trajectory of the cord on the form.

9 Claims, 10 Drawing Sheets

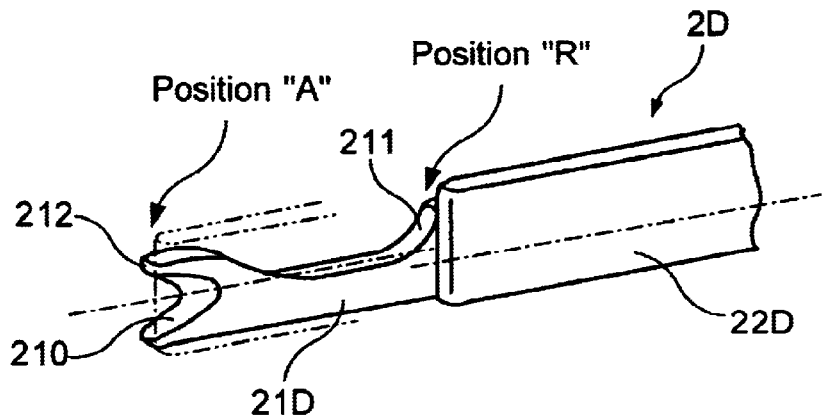
F I G. 2
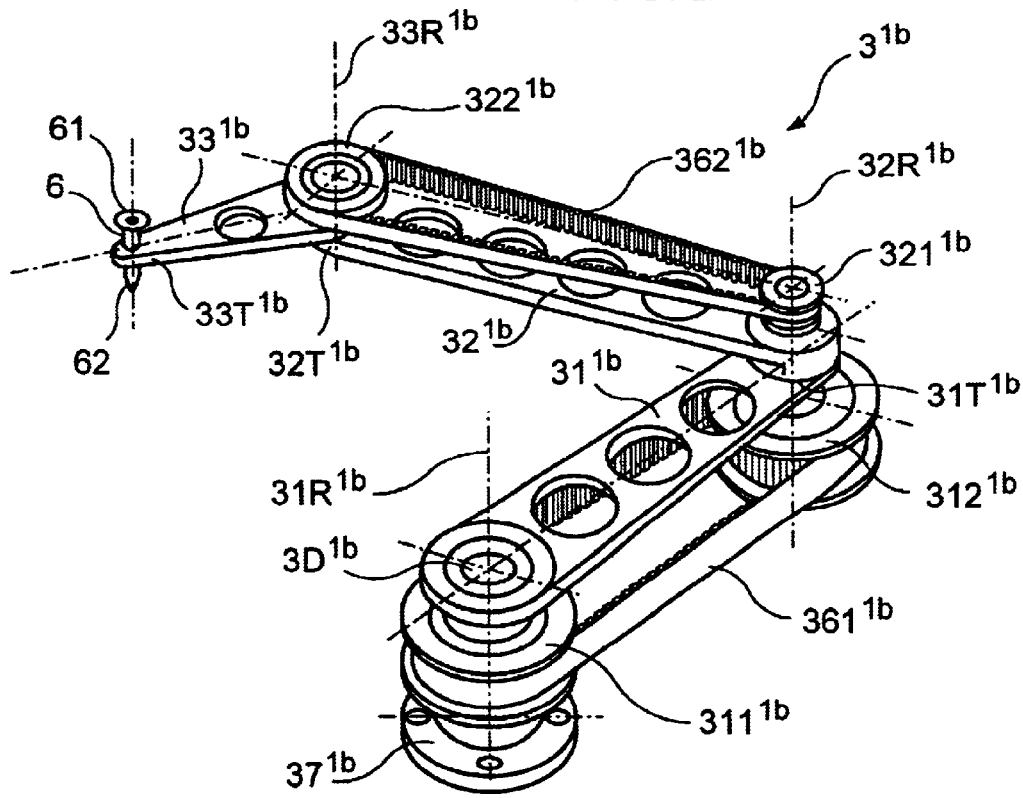
F I G. 3

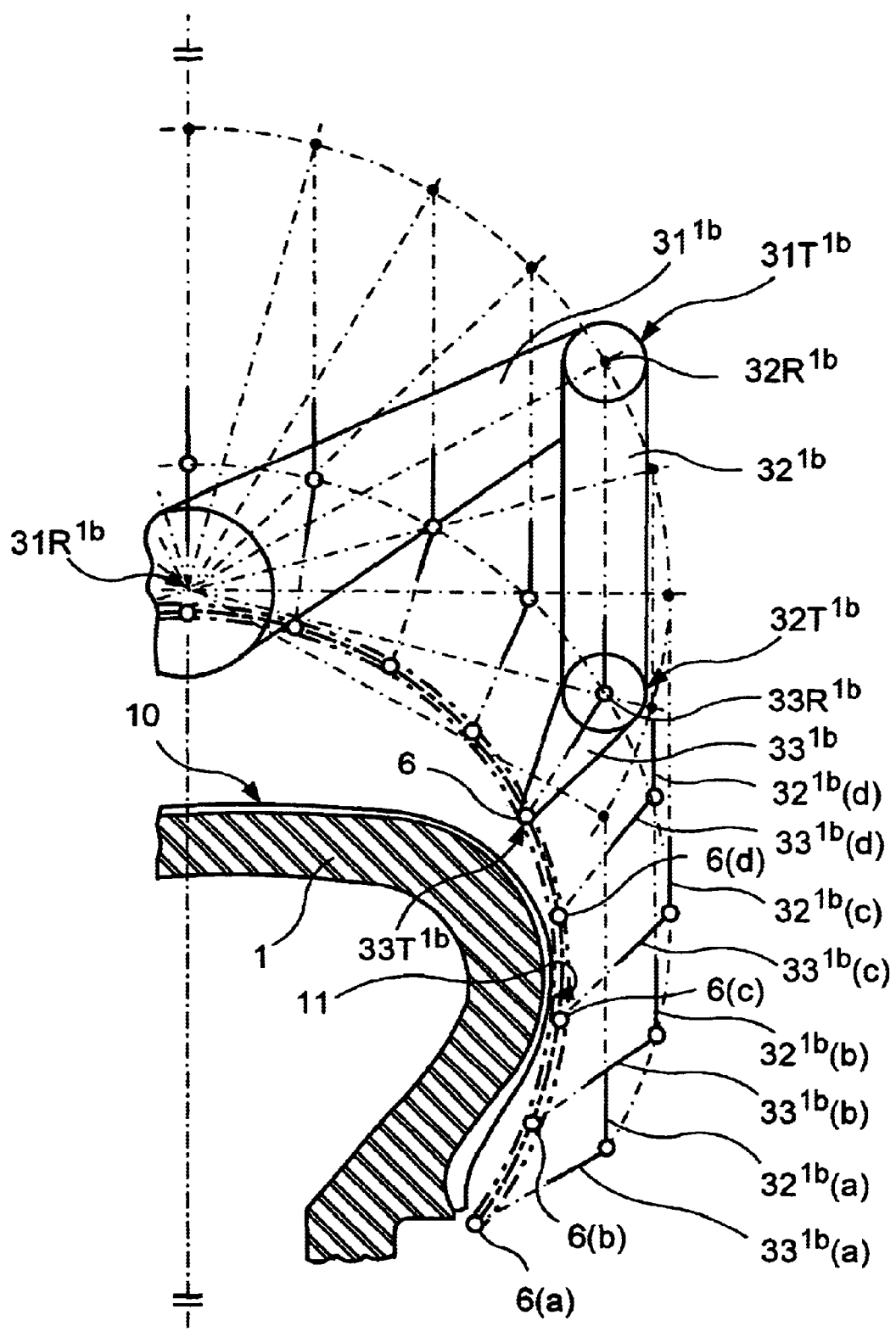
F I G. 4

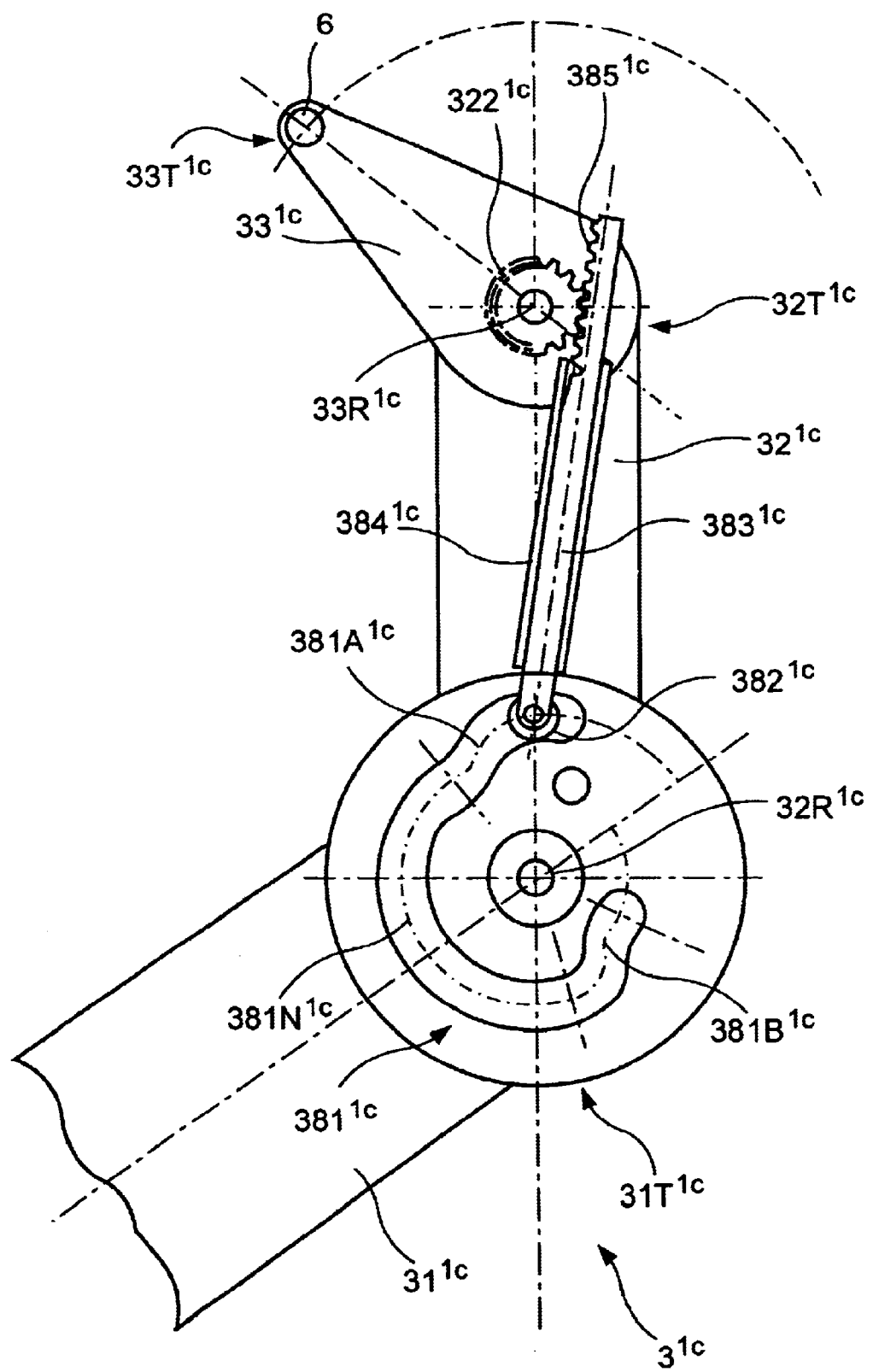
F I G. 6

APPARATUS WITH A COMBINATION OF MOVEMENTS FOR MANUFACTURING A TIRE REINFORCEMENT FROM A SINGLE CORD

BACKGROUND OF THE INVENTION

The present invention relates to the manufacture of tires. More precisely, it relates to the depositing of cords to constitute a tire reinforcement. More particularly, it proposes means suitable for manufacturing such a reinforcement on a form similar or identical to the form of the internal cavity of the tire, that is to say a substantially toroidal form.

In this technical field, processes and apparatus are already known which permit incorporation of the manufacture of the tire reinforcements into assembly of the tire itself. This means that, rather than having recourse to semi-finished products, such as reinforcement plies, one or more reinforcements are produced in situ, at the time of manufacture of the tire, from a cord spool. Of these processes and apparatus, the solution described in U.S. Pat. No. 5,453,140 is most particularly adapted for producing carcass reinforcements on a rigid core, the outer surface of which corresponds substantially to the form of the internal cavity of the finished tire. This patent discloses equipment in which the cord, intended to constitute a carcass reinforcement, is laid down in contiguous arches on a rigid core, via an eyelet fixed on a chain mounted on pulleys in such a way as to surround the core by forming a type of fork. The eyelet performs a to-and-fro movement around the core in such a way as progressively and contiguously to deposit an arch with each outward movement and an arch with each return movement, suitable pressers being used to apply the ends of said arches as they are formed on the rigid core pre-coated with uncured rubber.

SUMMARY OF THE INVENTION

The object of the present invention is to propose an improvement allowing laying down of a reinforcing cord on a core with more possibilities for controlling the final trajectory on the core.

The invention proposes an apparatus for manufacturing a tire reinforcement, said apparatus being intended for manufacturing a reinforcement constituted from a cord supplied continuously and on demand by a suitable distributor, said apparatus being intended for use in cooperation with a substantially toroidal form on which said reinforcement is built up progressively by laying arches of said cord, according to a final trajectory desired for said cord, down on the surface of said form, said apparatus comprising depositing members arranged on a support, the depositing members comprising:

a guide member in which the cord may slide freely,
a mechanism for actuating said guide member in a cyclical, to-and-fro, movement, to bring said guide member in successive oscillations into the vicinity of each of the ends desired for the cord in said trajectory, said apparatus comprising pressers close to each end of said trajectory, for applying the cord onto the form at said ends, characterized in that the apparatus comprises means of imparting to the depositing member support an alternating movement synchronized with the movement of the actuating mechanism, allowing deflection of the final cord trajectory on the form.

Reference should be made to the aforesaid patent, since the present invention includes not only the process described therein but also to a considerable extent the pressers used to allow formation of a loop and to apply said loop against the core. By way of a reminder, the pressers essentially each comprise a fork and a hammer. Apart from a few details, the presser embodiment described therein could be used as it is, even if a novel form is proposed below for said pressers.

Before embarking on a detailed description of these novel means of actuating the cord guide member, it would be helpful to remember certain useful points.

First of all, it should be noted that, as in the above-cited patent, the term "cord" must be understood in a completely general sense, covering a monofilament, a multifilament, an assembly such as for example a cable or a plied yarn, or a small number of grouped cables or plied yarns, whatever the nature of the material and whether or not the "cord" is pre-coated with rubber. In the present specification, the term "arch" is used to designate a portion of cord extending from a singular point to another in the reinforcement armature. All these arches disposed over the entire periphery of the tire form the reinforcement proper. An arch as defined here may be part of a carcass or of a crown reinforcement or of any other type of reinforcement. These arches may be separated by cutting the cord during depositing thereof, or they may all be connected together in the finished reinforcement, for example by loops.

Basically, the invention relates to continuous deposition of a reinforcing cord, in a configuration as close as possible to the configuration in the finished product. Since the cord is supplied on demand by a suitable distributor comprising for example a cord spool and, if applicable, a device for controlling the tension of the cord withdrawn from the spool, the apparatus for manufacturing a reinforcement from a cord cooperates with a form (rigid core or reinforced membrane) on which the tire is manufactured. It is of little significance whether the reinforcement, to be complete, is fabricated in several successive passes of the depositing members described with or without cutting of the cord between two passes.

When positions or directions are defined by the words "radially, axially, circumferentially" or when radii are mentioned, the reference point is taken to be the core on which the tire is manufactured, or the tire itself, which comes to the same thing. The geometric axis of reference is the axis of rotation of the form.

Likewise, as has already been pointed out in the above-cited patent, the cord depositing members described here also allow the production of a reinforcement, for example a carcass reinforcement, in which the laying pitch of the cord is variable. "Laying pitch" is understood to mean the distance resulting from the sum of the space between two adjacent cords and the diameter of the cord. It is well known that, for a carcass reinforcement, the space between cords varies according to the radius at which it is measured. This is not the variation referred to here, which is a variable pitch at a given radius. For this, it is sufficient to vary the speed of rotation of the form as a function of any suitable law without changing the working speed of the guide member. A tire is thus obtained, the carcass reinforcing cords of which, for example for a radial carcass, are disposed at a pitch exhibiting controlled variation for a given radial position.

Various embodiments of the cord depositing members may be envisaged. There are described below various embodiments of said depositing members which constitute the subject matter of the application FR00/01393 filed on Feb. 1, 2000 and corresponding to U.S. Ser. No. 09/773,985 filed Feb. 1, 2001. The first embodiment uses a series of three functional oscillating arms. In addition, possible variants are described for this first embodiment. A series of three functional oscillating arms is preferably used for depositing carcass arches extending from one bead to the other of the tire. The second embodiment uses a series of two functional oscillating arms. Furthermore, a variant embodiment is given for this second embodiment. A series of two functional oscillating arms is used for example for depositing carcass arches extending from a bead to a shoulder of the tire. The third embodiment uses a single functional oscillating arm, which is sufficient for the simplest deposition to be performed.

When "n" functional oscillating arms are used which are arranged in series (n>1), the term "$n^{th}$ arm" is used to designate the functional oscillating arm to which the cord guide member is directly fixed, the base arm always being the "first oscillating arm". The oscillating arms are arranged in series in such a way that, in general, the conveying head of the oscillating arm "p" (p being<n) conveys the center of rotation of the oscillating arm "p+1". This is why it is stated above that the conveying head conveys the cord guide member directly, or only "indirectly" (that is to say through the intermediary of one or more other functional oscillating arms). In all the examples described, the geometric axis of the center of rotation of the first oscillating arm is, in the working position, entirely exterior to the form, with which it never comes into contact, that is to say not even via its extensions.

The apparatus causes the cord guide member to describe a movement which is substantially included in a plane—the plane of movement—perpendicular to the geometric axis of rotation of the base arm. In another aspect of the apparatus according to the invention, the base arm, or according to the variants, each of the oscillating arms used, is of planar, long-limbed appearance, and the base arm oscillates in this plane of movement, or all the oscillating arms move in parallel, neighboring planes, one of them being very close to this plane of movement, or even merged with this plane of movement, depending on the type of guide member used.

Emphasis should also be laid on the fact that, according to one aspect of the reinforcing cord arch depositing principle here under consideration, an actuating mechanism causes the cord guide member to describe a movement substantially included in a plane—the plane of movement. When the invention is applied to an actuating mechanism of said guide member comprising a chain as described in U.S. Pat. No. 5,453,140, the plane of movement is the plane described by the eyelet '33' (a reference numeral thus identified constituting a reference to the drawings of U.S. Pat. No. 5,453,140. This plane is perpendicular to the axis of rotation of the pulleys guiding the chain 30. It may be considered that the depositing member support is the framework 51 of the presentation device 5. When applied to the machine described in the above-cited patent application, the invention consists, for example, in actuating said framework 51 with an alternating translational movement perpendicular to the plane of movement, in synchronism with the movement of the eyelet 33 in said plane of movement, to act on the deposition trajectory of the cord 4 on the form 1. The framework 51 may be actuated, for example, by interposing a suitable mechanism between the slide rail 50 and the frame 2 or between the framework 51 and the slide rail 50. In this way, the trajectory according to which the cord is deposited on the surface of the core also depends on this movement perpendicular to the plane of movement. Thus, if said framework 51 is displaced as indicated (translational movement perpendicular to the plane of movement) over a predetermined distance while the eyelet 33 passes from the zone close to one bead to the zone close to the other bead, the cord arch deposited is not arranged radially, but rather forms an angle which is not zero, as in the case shown in FIG. 12 below.

The description which follows affords a full understanding of a particular instance of the invention when applied to the members which constitute the subject matter of application FR00/01393.

DESCRIPTION OF THE DRAWING

FIG. 2 is a detail of a presser of this apparatus;

FIG. 3 illustrates a first variant of the first embodiment of the apparatus;

FIG. 4 shows in more detail a stage of operation of the apparatus according to the first embodiment;

FIG. 6 illustrates a second variant of the first embodiment;

DESCRIPTION OF PREFERRED EMBODIMENTS

Figure 1:
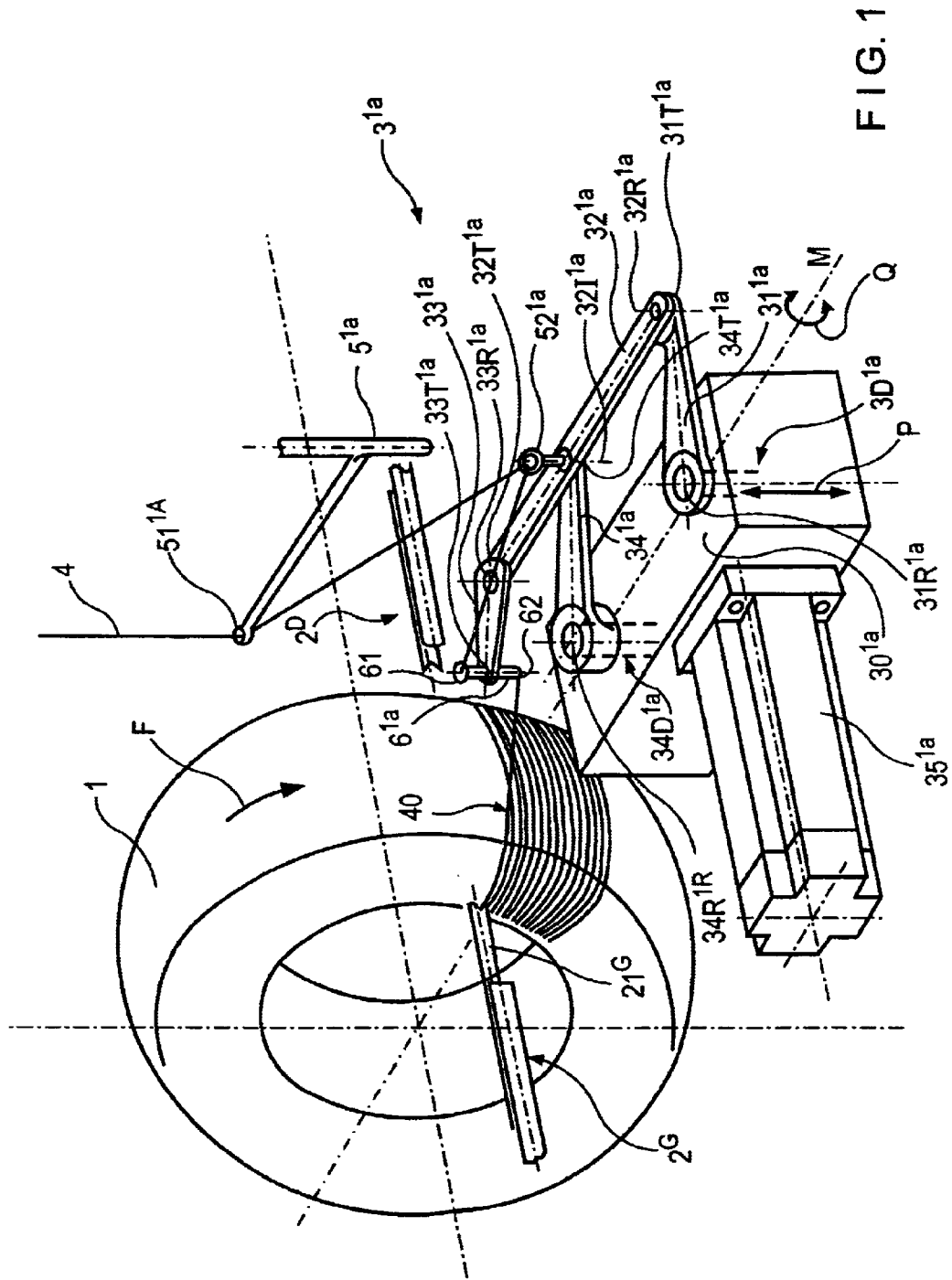
FIG. 1 is a perspective view showing a first embodiment of an apparatus, showing schematically a first exemplary embodiment of the invention.

FIG. 1 (as moreover for all the examples described, without this being limiting) shows that the form is a core 1 (rigid and dismantlable) defining the geometry of the inner surface of the tire. This is coated with rubber 10 (see FIG. 7), for example a butyl rubber-based sealing rubber layer and a rubber layer ensuring coating of the carcass cords. The rubber 10 covering the core 1 allows a cord 4 to be held on the core 1 by an adhesive effect as it is deposited thereon. The core 1 is driven rotationally by any suitable device, not shown.

The depositing members proper comprise an actuating system essentially comprising a system of oscillating arms $3^{1a}$ on the one hand and presser devices $2^G$ and $2^D$ on the other. With regard to the reference numerals in the Figures, the convention used is to designate similar members with the same main reference numerals, for example "3" for the system of oscillating arms, and to indicate specific association with an embodiment or a variant by an exponent, for example "$1a$" for the first embodiment (using a series of three oscillating arms), in its variant "a". A reference numeral without any specific marker relates to a member which is always the same in the different variants or should be understood as designating without distinction all the variants of all the embodiments.

In the first embodiment shown in FIG. 1, the system of oscillating arms $3^{1a}$ comprises three functional oscillating arms $31^{1a}$, $32^{1a}$, $33^{1a}$ arranged in series and an auxiliary arm $34^{1a}$. This arrangement with three functional oscillating arms allows easy movement of the guide member from one bead to the other and thus the obtainment, in conjunction with the presser devices $2^G$ and $2^D$, of operation of the apparatus from one bead to the other. An eyelet 6 constitutes in all the examples described here the materialization of the cord guide member 4 (without being limiting). The eyelet is always mounted on the last oscillating arm. Before going into detail, it should simply be pointed out that the system of oscillating arms 3 fulfils the function fulfilled by the chain system in above-cited patent, and the presser devices $2^G$ and $2^D$ are positioned in a suitable manner to play the role described in the above-cited patent.

The system of oscillating arms $3^{1a}$ is mounted on a plate $30^{1a}$ and causes the eyelet $6^{1a}$ to describe a movement over the core 1, and even passing round it in many of the embodiments. In all scenarios, the system of oscillating arms 3 causes the eyelet 6 to perform a movement in a plane. The eyelet 6 is flared: it forms a funnel with a large opening 61 on the side on which the cord 4 arrives and a smaller orifice 62 on the side on which the cord 4 exits (see also FIG. 3). It is the small orifice 62 which describes a movement in said plane of movement of the guide member. It is a good idea to take care over production of the edges of the orifice 62, so as not to damage the cord 4, since the outlet portion thereof is generally arranged substantially in the plane of movement, that is to say in a plane which is perpendicular to the guide direction imposed by the eyelet 6. As a variant, it is possible to orient the eyelet in such a way as to resemble the average orientation of the cord when leaving the eyelet.

The plate $30^{1a}$ comprises an oscillating shaft $3D^{1a}$ (see also 3D in FIGS. 10 and 11) motorizing the system of oscillating arms, the geometric axis of said oscillating shaft $3D^{1a}$ being situated radially outside the core 1. In other words, the geometric axis of said oscillating shaft $3D^{1a}$ is situated beyond the surface of the core 1, without the extension thereof coming into contact with the core 1. Said oscillating shaft $3D^{1a}$ does not effect continuous rotation, but rather oscillates within the limits of an arc smaller than 360°, the precise value depending on the exact constitution of the system of oscillating arms 3 and the intended use.

The entire oscillating arm system 3 itself is quite compact. All the depositing members, i.e. the oscillating arm system 3 and the presser devices 2, including the motor and the drive mechanism, form a sub-assembly capable of being easily presented to the core in a suitable manner, and capable of being retracted so that, for example, other devices may be presented to the core which are used for manufacture of a tire or for removal of the core to other tire building stations.

A base arm (or first arm) $31^{1a}$ (FIG. 1) is mounted on the oscillating shaft $3D^{1a}$ via a center of rotation $31R^{1a}$. The first arm $31^{1a}$ comprises a conveying head $31T^{1a}$ at the opposite end from the center of rotation $31R^{1a}$. A second arm $32^{1a}$, articulated by a center of rotation $32R^{1a}$ of the second arm, is mounted on the conveying head $31T^{1a}$ of the first arm $31^{1a}$. This second arm $32^{1a}$ comprises a conveying head $32T^{1a}$. So as to control the relative position of the second arm $32^{1a}$ relative to the first arm $31^{1a}$, in this example a parallelogram is formed by means of an auxiliary arm $34^{1a}$, mounted oscillatingly about an oscillating shaft $34D^{1a}$ via the center of rotation $34R^{1a}$ thereof. The center of rotation $34R^{1a}$ is situated radially outside the surface of the core 1, and radially between the latter and the center of rotation $31R^{1a}$ of the first arm $31^{1a}$. The auxiliary arm $34^{1a}$ comprises a conveying head $34T^{1a}$, articulated to the second arm $32^{1a}$ which comprises to this end an intermediate center of rotation $32I^{1a}$ situated between the center of rotation $32R^{1a}$ and the conveying head $32T^{1a}$ of said second arm $32^{1a}$.

It should be noted that it is not necessary for the singular points constituting the centers of rotation $31R^{1a}$, $34R^{1a}$ and the conveying heads $31T^{1a}$, $34T^{1a}$ to form a parallelogram. These points are preferably precisely aligned as they pass through the median position in the median plane, defined by the axis MM joining the centers of rotation $31R^{1a}$, $34R^{1a}$ and by the geometric axis of the shaft 3D (as well as by the geometric axis of the shaft $34D^{1a}$ which is naturally parallel with the former). In this way, the eyelet 6 describes a movement, the course of which is symmetrical with regard to this median plane, and it reaches the vicinity of each of the bead zones defined on the core 1 in a perfectly symmetrical movement, even in the control thereof. This does not of course exclude the ends of the eyelet movement from not being at symmetrical points relative to the median plane, for example for manufacturing a tire, the trajectory of the arches of which is not symmetrical. This would be the case in the fabrication of a tire whose diameters at the seat (usual term for designating the mounting seat) of each of the beads are different.

Finally, the apparatus comprises a third arm $33^{1a}$, articulated via its center of rotation $33R^{1a}$ to the conveying head $32T^{1a}$ of the second arm $32^{1a}$. This third arm $33^{1a}$ comprises a conveying head $33T^{1a}$, on which the eyelet 6 is directly mounted. Below, with the aid of FIG. 5, the control means will be described for the relative position of the third arm $33^{1a}$ with regard to the second arm $32^{1a}$, not shown in FIG. 1 so as not to overload the drawing. It should simply be noted, at this stage, that the use of such a third oscillating arm, mobile relative to the second oscillating arm, assists in advancing towards the beads the conveying end directly supporting the eyelet 6, that is to say assists in passing round the wall of the core 1 with regard to the center of rotation of the first arm, to arrive at zones hidden by said wall, undercut relative to the radial viewing direction. Finally, it should be noted that the relative orientation of the third arm $33^{1a}$ relative to the second arm $32^{1a}$ allows good visualization of the degree of functional freedom between said arms.

Figure 10:
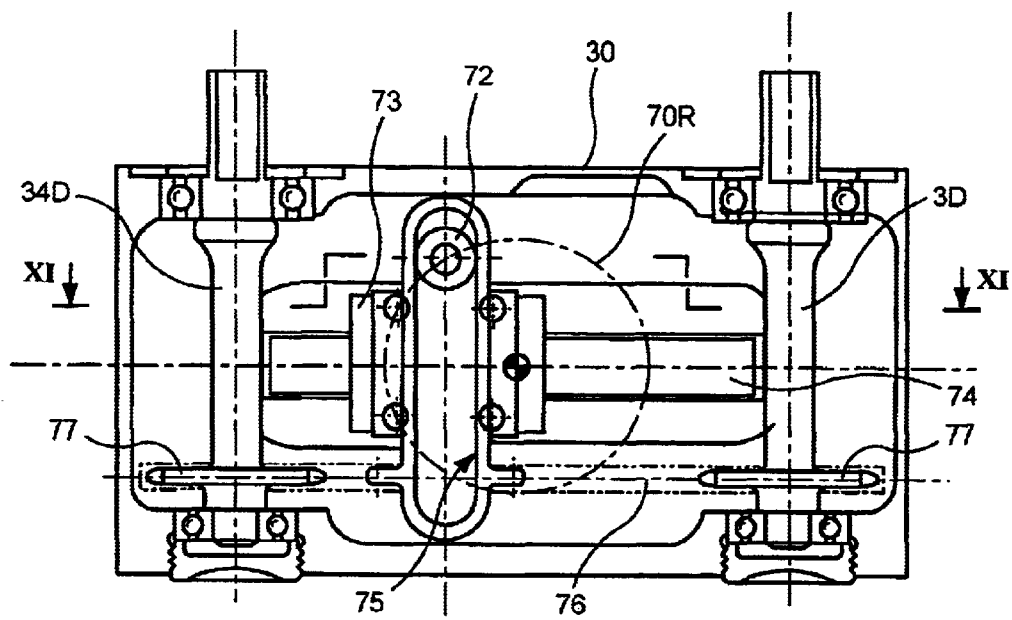
FIG. 10 is an elevational view (section in the plane defined in FIG. 1 by the axis MM and the geometric axis of the shaft 3D, also called the "median plane") of the control mechanism used in the first embodiment illustrated in FIG. 1.
Figure 11:
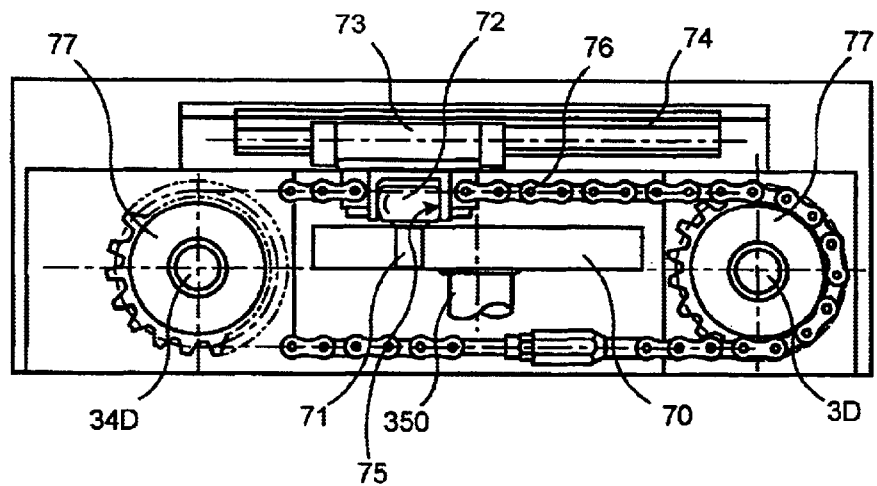
FIG. 11 is a section along line XI–XI in FIG. 10.

A motor $35^{1a}$ controls movement of all the arms $31^{1a}$, $32^{1a}$, $33^{1a}$, $34^{1a}$, preferably by motorization of the two shafts $3D^{1a}$ and $34D^{1a}$, as explained in detail by means of FIGS. 10 and 11. The motor $35^{1a}$ drives a disk 70 rotationally. A shaft 71 is mounted in the disk 70, in a predetermined eccentric position. The shaft 71 supports a roller 72. A carriage 73 moves translationally on slides 74 formed on the casing of the plate $30^{1a}$. The carriage 73 comprises a rectilinear slot 75, oriented perpendicularly to the direction of translation of the carriage 73 on the slides 74. A chain (with tension device) 76 is mounted on two identical pinions 77, and connected by its ends to the carriage 73. One of the identical pinions 77 is fixed to the shaft 3D and the other to the shaft 34D.

Assuming that the motor 35 imparts a rotational movement at constant speed to the control shaft 350, the roller 72 performs a circular movement 70R at constant speed. This being so, the roller 72 ascends and descends in the slot 75 and moves the carriage 73 translationally, thus converting a constant speed rotational movement into an alternating, linear to-and-fro movement, the speed of which varies sinusoidally. Through the intermediary of the chain 76 and the identical pinions 77, this alternating linear movement is converted at the shafts 3D and 34D into oscillations sweeping through an arc smaller than 360°. The amplitude of the oscillation may be adjusted by adjusting the radius at which the shaft 71 (thus the roller 72) is mounted eccentrically on the disk 70. It is of course possible to superimpose on the law of movement conversion thus created mechanically any control law specific to the rotation of the rotor of the motor 35.

Returning to the description of FIG. 1, a cord 4 is supplied via a spool (not shown) and is then wound onto a feed device $5^{1a}$ allowing the cord 4 to be fed correctly to and presented to the depositing members. The feed device $5^{1a}$ preferably comprises means ensuring control of the tension of the cord 4 and, if applicable, the necessary compensation between the depositing members $3^{1a}$ and the spool, owing to the fact that the cord is adjusted by said depositing members to a cyclically variable speed, which may even be negative. The cord 4 is threaded into a first ring $51^{1a}$ disposed at some distance from the plane of movement, in which the eyelet 6 performs its cyclical movement. The ring $51^{1a}$ is disposed in a median manner with respect to the core 1. The cord 4 is then threaded into a ring 52 fixed to the second arm $32^{1a}$.

This cord 4 is threaded onto an eyelet 6. The eyelet 6 describes a to-and-fro movement from one bead to the other, or more precisely from one location close to a bead to a location close to the other bead. According to the invention, the process for manufacturing a tire reinforcement, from a cord supplied continuously and on demand by a suitable distributor, using a substantially toroidal form having an axis of rotation and on which said reinforcement is built up progressively by depositing arches of said cord according to a desired trajectory for the cord on the surface of said form, uses depositing members arranged on a support and comprising:

a guide member in which the cord may slide freely, means for actuating said guide member in a cyclical movement performed in a plane of movement of the depositing members, to bring said guide member in successive oscillations into the vicinity of each of the desired ends for the cord in said trajectory, and uses pressers arranged at each end of said trajectory, for applying the cord onto the form at said ends, the basic cycle of the process comprising the following stages:

actuating the form with rotation at a speed which is not zero, in synchronizm with the rotation of the form, with the cord being held against the form for at least a sufficient time, on the one hand moving the guide member in said plane of movement as far as a first end and on the other hand said plane of movement in synchronizm, applying the cord to the form at this first end and holding it there for at least a sufficient time, by means of a presser device, repeating the second stage in the opposite direction as far as a second end, applying the cord to the form at this second end and holding it there for at least a sufficient time, by means of another presser device, and thus repeating this basic cycle until the desired number of arches is deposited on the surface of the form, along the trajectory desired for the cord on the surface of the form.

Various exemplary embodiment may be envisaged. Advantageously, the speed of rotation of the form is constant, the form effecting a first displacement in synchronism with the displacement of the guide member from one end to the other, the form effecting a second displacement, in reverse with respect to the first displacement, in synchronism with the guide member which reverses its movement at one of the ends.

Returning to the apparatus illustrated in the present specification, FIG. 2 shows a presser $2^D$ which comprises a fork $21^D$ and a hammer $22^D$, both of these being movable between a retracted position, at R (position remote from the core 1), and an advanced position, at A. Dash-dotted lines are used to show the hammer in the advanced position. With regard to the reference numerals in the Figures, the convention used is to designate each of the presser members with a main reference numeral, for example "21" for the fork, and to indicate specific association with the presser on one side (the left- or right-hand side in FIG. 1), respectively by the letter "$^G$" (left) or "$^D$" (right) positioned as an exponent. A reference numeral without any specific marker relates in generic manner without distinction to one or other of the pressers or their members.

Reference can be made to the appropriate part of the description of the above-cited patent for an understanding of the functions of the fork and hammer 22 and the respective roles of the positions stated as advanced A and retracted R. FIG. 2 shows that both the fork 21 and the hammer 22 have the appearance of parallel blades. With respect to the hammer, the fork 21 is always disposed radially on the side of the axis of rotation of the core 1. The fork 21 has a V-shaped head 210, allowing the cord 4 to be taken up and centered. During the gripping phase, the plane formed by the "V" is disposed perpendicularly to the cord 4. When the cord 4 has to be arranged radially, as in FIG. 1, the blade forming the fork 21 is oriented at a tangent to a circle concentric with the core 1. The fork 21 also comprises a recess 211, the role of which will become apparent below.

It is known that the fork 21 is intended to bring the cord 4 against the core 1. To this end, the advancing movement thereof towards the core 1 is initiated when the eyelet 6 has brought the cord 4 to one end of the to-and-fro movement, that is to say when the apparatus is substantially in the configuration in FIG. 4. The fork 21 stops when it has anchored the cord in the rubber coating the core 1. Said fork 21 thus allows the cord 4 to be deposited with sufficient force for it to adhere correctly at the desired location. Returning to FIG. 1, and taking into account the laying pitch desired, which is itself a function of the rotational movement of the core 1 shown schematically by the arrow F, continuation of the movement of the system of oscillating arms 3 causes the formation of a loop around the tip 212, which begins deposition of a new arch 40 on the core 1 (see FIG. 1). And passage of the eyelet 6 beyond the fork 21 during the return phase is permitted by the recess 211, although the fork 21 is positioned against the core 1 in this manufacturing stage. It should be pointed out that the size of the loop is a function of the dimensions of the tip 212.

The hammer 22 acts after the fork 21 and after the "return" phase of the eyelet 6. The hammer 22 presses on the cord 4 at a slightly higher radial position. Preferably it holds the cord 4 while the fork 21 is retracted. The hold provided by the hammer during retraction of the fork assists in preventing the fork 21 from taking with it the loop of cord 4 which has formed about one of its tips 212 and which, even if it is stuck to the rubber, could have a tendency to remain attached to the fork. Anchoring of the cord 4 on the bead is thereby made perfectly reliable.

Of course, switching into the advanced position, and the return to the retracted position, are controlled, both for the fork 21 and the hammer 22, in synchronizm with the system of oscillating arms $3^{1a}$, by any suitable device (return movement of the shaft 3D by a suitable mechanical transmission, for example using belts or cables, or by electrical synchronization between a plurality of motors). Hereinafter, such a device or its equivalent is simply shown schematically by an arrow and designated by reference numeral 2, it being understood that said numeral designates wholly generally a device with two acting elements, such as a fork and a hammer, acting in sequence on the cord 4.

FIG. 3 shows a variant of the same first embodiment, comprising a system of oscillating arms $3^{1b}$, differing from that described above essentially in the means of controlling the movement of the second arm $32^{1b}$ with regard to the base arm (or first arm) $31^{1b}$. In this variant of the first embodiment, the system of arms $3^{1b}$ again comprises three functional arms $31^{1b}$, $32^{1b}$, $33^{1b}$ arranged in series, and, in conjunction with presser devices, said control means also allow operation of the apparatus from one bead to the other. A base arm (or first arm) $31^{1b}$ is mounted on an oscillating shaft $3D^{1b}$ via a center of rotation $31R^{1b}$. The first arm $31^{1b}$ comprises a conveying head $31T^{1b}$ at the opposite end from the center of rotation $31R^{1b}$. A second arm $32^{1b}$, articulated by a center of rotation $32R^{1b}$ of the second arm, is mounted on the conveying head $31T^{1b}$ of the first arm $31^{1b}$. This second arm $32^{1b}$ comprises a conveying head $32T^{1b}$. Finally, the apparatus comprises a third arm $33^{1b}$, articulated via its center of rotation $33R^{1b}$ to the conveying head $32T^{1b}$ of the second arm $32^{1b}$. This third arm $33^{1b}$ comprises a conveying head $33T^{1b}$, on which the eyelet 6 is directly mounted.

A drive pulley $311^{1b}$ is shown centered on the center of rotation $31R^{1b}$ of said first arm. The drive pulley $311^{1b}$ is firmly connected with a flange $37^{1b}$ mounted fixedly on said plate (not shown in FIG. 3). A driven pulley $312^{1b}$ is firmly connected (that is to say without the possibility of any relative rotation) to the second arm $32^{1b}$. A toothed belt $361^{1b}$ connects said drive and driven pulleys. The diameters of the drive pulley and the driven pulley are identical so that, during movement thereof, the second arm $32^{1b}$ always remains parallel to itself. The person skilled in the art will have understood that, since it is a question of positioning the arm or various arms precisely, the pulleys used are toothed pulleys. The belts, which are also toothed, operate without sliding relative to the pulleys on which they are mounted. It is of course possible to use any equivalent slide-free system to connect the arms whose position has to be controlled, such as for example a chain and pinions. In the present specification, the terms "pulley" and "belt" cover all equivalent systems for slide-free control of the relative positions.

In this example, the flange $37^{1b}$ is stationary in space but, more generally, it is important for the angular position thereof to be controlled independently of control of the oscillation of said first arm. It is possible, for example, to introduce a degree of freedom between the plate and the flange $37^{1b}$ and to control the relative position of said flange $37^{1b}$ relative to the plate, so as to act selectively on the spatial position of the drive pulley $311^{1b}$ in order, for example, to conform the movement performed by the eyelet 6 to different sized forms.

As far as the means of controlling the relative position of the third arm $33^{1b}$ relative to the second arm $32^{1b}$ are concerned, they essentially comprise a drive pulley $321^{1b}$ centered on the center of rotation $32R^{1b}$ of said second arm $32^{1b}$, firmly connected (no relative rotation possible) with the first arm $31^{1b}$, and they comprise a driven pulley $322^{1b}$ firmly connected (again, no relative rotation possible) with said third arm $33^{1b}$. A toothed belt $362^{1b}$ connects said drive and driven pulleys. The diameters of the drive pulley and the driven pulley are different, their respective values being calculated so that the conveying end $33T^{1b}$, during movement thereof, reaches the zone of the core 1 close to the bead (see FIG. 4) without the second arm $32^{1b}$ striking the sidewall 11 of the core 1.

FIG. 4 shows the eyelet 6 in the position 6(a) imposed by the above-described apparatus, at one end of the to-and-fro movement of the functional oscillating arms $31^{1b}$, $32^{1b}$, $33^{1b}$. The corresponding configuration adopted by the second and third arms of the apparatus is shown at $32^{1b}(a)$ and $33^{1b}(b)$ respectively. Various other positions and configurations are designated by the reference letters (b), (c), (d).

As a variant, the drive pulley $321^{1b}$ could also be mounted freely with respect to the first arm $31^{1b}$ and driven by a belt wound on the one hand around a pulley firmly connected with said drive pulley $321^{1b}$ and on the other hand wound round another pulley (not shown) concentric with the geometric axis $3D^{1b}$ and motorized independently both of the movement of the first arm and of the movement of the pulley $311^{1b}$. This provides more latitude when it comes to controlling the movement of the third arm relative to the second.

Figure 5:
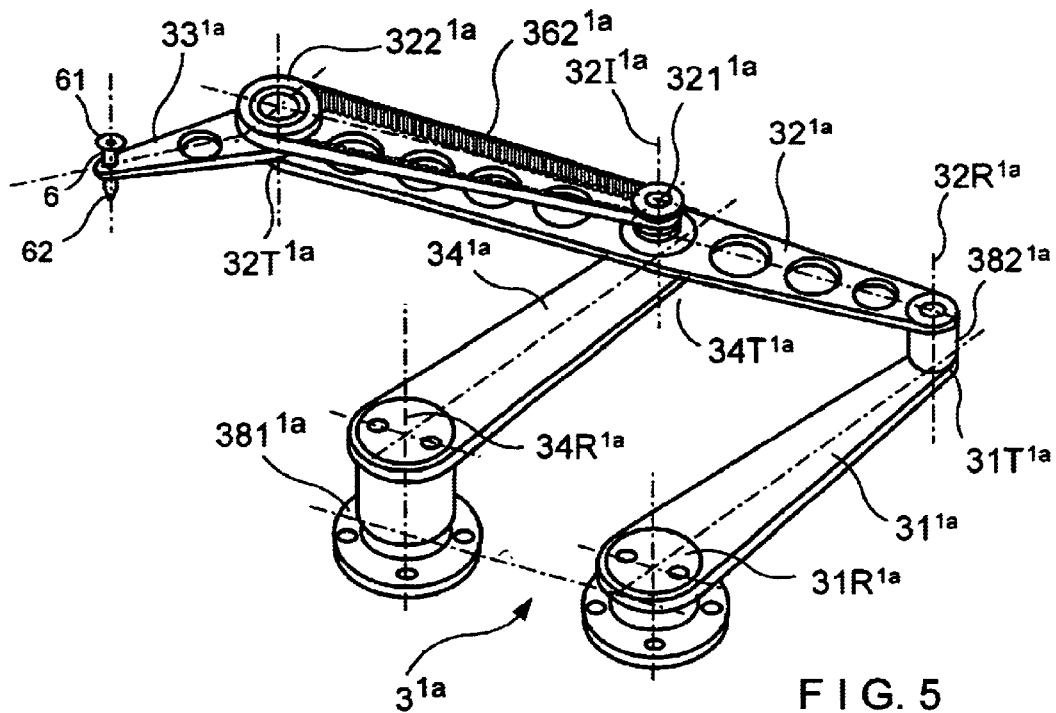
FIG. 5 illustrates a detail of the first embodiment which is not visible in FIG. 1.

FIG. 5 illustrates an equivalent control means, mounted on the system of oscillating arms $3^{1a}$ of FIG. 1. This Figure shows a third pulley $321^{1a}$ centered on the intermediate center of rotation $321^{1a}$ of said second arm $32^{1a}$, firmly connected (no relative rotation possible) with the intermediate arm $34^{1a}$, and a fourth pulley $322^{1a}$ firmly connected (again, no relative rotation possible) with said third arm $33^{1a}$. A toothed belt $362^{1a}$ connects said drive and driven pulleys. The diameters of the drive pulley and the driven pulley are different, their respective values being calculated so that the conveying end $33T^{1a}$, during movement thereof, reaches the zone of the core 1 close to the bead (see FIG. 4) without the second arm $32^{1a}$ striking the sidewall 11 of the core 1. The previous comment about another possibility for controlling the relative movement of the third arm relative to the second also applies to this variant.

Emphasis should also be laid on another detail which is readily visible in FIG. 5. In this Figure, the system of arms $3^{1a}$ is substantially configured as in FIG. 1. In this configuration, the second arm $32^{1a}$ is on one side of the first arm $31^{1a}$ and the intermediate arm $34^{1a}$ (and on one side of the median plane defined by the axis MM and the geometric axis of the shaft $3D^{1a}$) and remains on this side during the part of the movement during which the eyelet 6 travels over the half of the core 1 situated on one side of said median plane. During the movement from one side of the core to the other side, the second arm $32^{1a}$ is caused to pass to the other side of the median plane and, in doing this, to the other side of the first arm $31^{1a}$ and the intermediate arm $34^{1a}$. During the same movement, the intermediate arm $34^{1a}$ a passes over the first arm $31^{1a}$. It is thus important for the arms to be correctly superposed so that this movement is possible. This is the role of the distance sleeves $381^{1a}$ and $382^{1a}$. It goes without saying that this comment is of general application. The oscillating arms articulated to each other, insofar as they perform a movement symmetrical in its course relative to a median plane, have to be superposed judiciously relative to one another to allow all the desired crossings of the arms.

Figure 7:
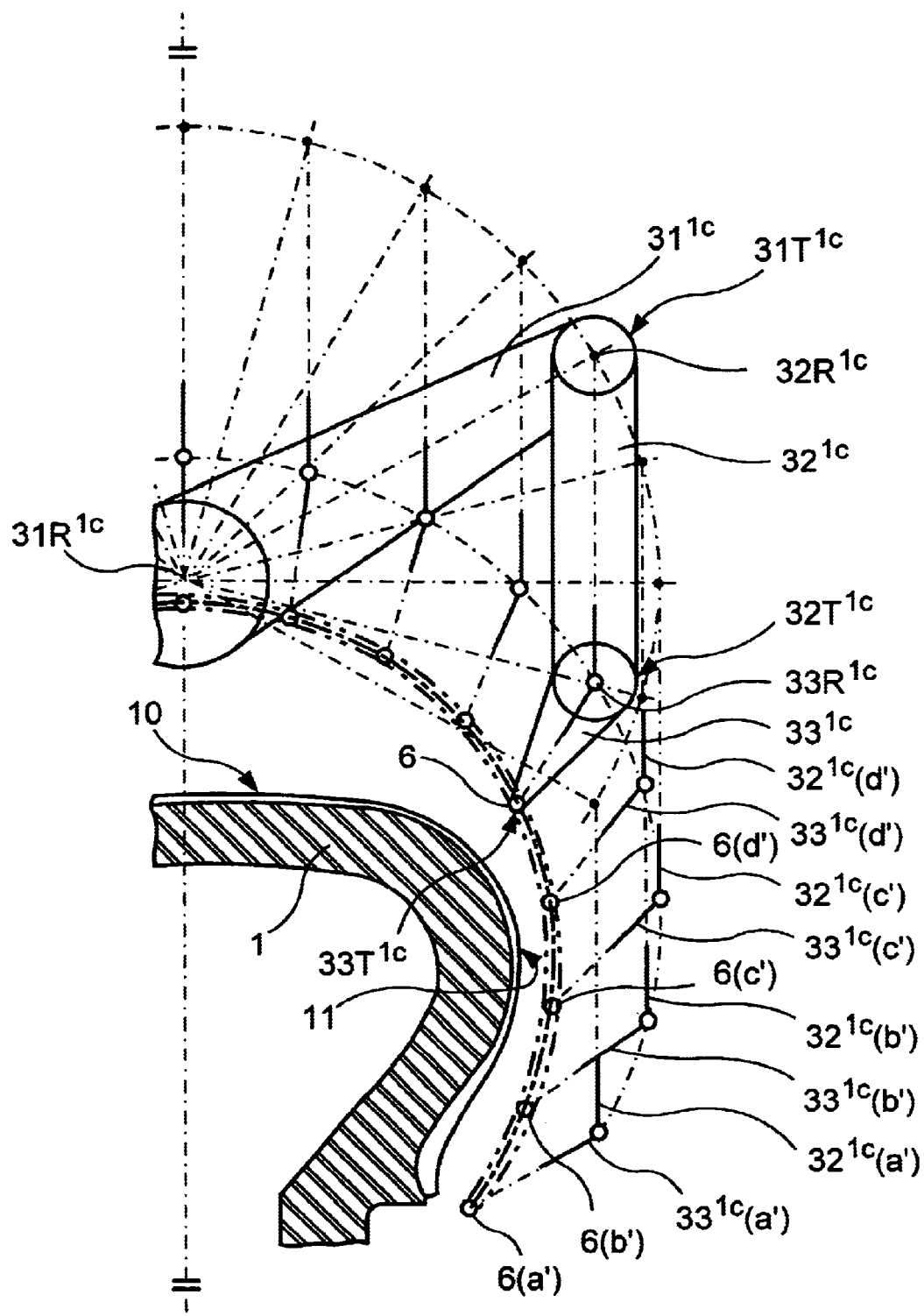
FIG. 7 shows the successive stages of operation of the second variant of the first embodiment.

With reference to FIGS. 6 and 7, another variant of the first embodiment will now be explained, said variant again relating to control of the movement of a third arm $33^{1c}$. In this further variant of the first embodiment, the system of arms $3^{1c}$ again comprises three functional arms $31^{1c}$, $32^{1c}$, $33^{1c}$ arranged in series, and, in conjunction with presser devices, said control means also allows operation of the apparatus from one bead to the other.

The Figures show a base arm (or first arm) $31^{1c}$ and a second arm $32^{1c}$, a description of the relative movement between the first and second arms being superfluous since it may be identical to that which has been described for the system of arms $3^{1a}$ or $3^{1b}$. The first arm $31^{1c}$ comprises a conveying head $31T^{1c}$. A second arm $32^{1c}$, articulated by a center of rotation $32R^{1c}$ of the second arm, is mounted on the conveying head $31T^{1c}$ of the first arm $31^{1c}$. This second arm $32^{1c}$ comprises a conveying head $32T^{1c}$. Finally, the apparatus comprises a third arm $33^{1c}$, articulated via its center of rotation $33R^{1c}$ to the conveying head $32T^{1c}$ of the second arm $32^{1c}$. This third arm $33^{1c}$ comprises a conveying head $33T^{1c}$, on which the eyelet 6 is directly mounted. A cam $381^{1c}$ is machined into the conveying head $31T^{1c}$ of the first arm $31^{1c}$. The cam comprises a neutral portion $381N^{1c}$ machined with a constant average radius, a final control portion $381A^{1c}$ with an increasing radius, for controlling the relative movement of the third arm $33^{1c}$ on one side of the core, and a final control portion $381B^{1c}$ with decreasing radius, for controlling the relative movement of the third arm $33^{1c}$ on the other side of the core. A toothed wheel $322^{1c}$ is mounted on the center of rotation $33R^{1c}$ of the third arm $33^{1c}$ and is firmly connected (no relative rotation possible) with said third arm $33^{1c}$. A connecting rod $383^{1c}$ slides in a guide $384^{1c}$ firmly connected with the second arm $32^{1c}$. The connecting rod $383^{1c}$ is thus guided in sliding manner with respect to the second arm $32^{1c}$. The connecting rod $383^{1c}$ carries on one side a cam follower $382^{1c}$ cooperating with said cam $381^{1c}$. On the opposite side from the cam follower $382^{1c}$, the connecting rod $383^{1c}$ comprises a rack $385^{1c}$ which is engaged on said toothed wheel $322^{1c}$. The profile of the cam in the final control portions $381A^{1c}$ and $381B^{1c}$ is selected so that, during movement of the third arm $33^{1c}$, the eyelet 6 mounted on the conveying end $33T^{1c}$ of the third arm $33^{1c}$ reaches the zone of the core 1 close to the bead (see position 6a in FIG. 7) without the second arm $32^{1b}$ striking the sidewall 11 of the core 1.

FIG. 7 shows the eyelet 6 in the position 6(a') imposed by the above-described cam apparatus, at one end of the to-and-fro movement of the functional oscillating arms $31^{1c}$, $32^{1c}$, $33^{1c}$. The corresponding configuration adopted by the second and third arms of the apparatus is shown at $32^{1c}(a')$ and $33^{1c}(a')$ respectively. Various other positions and configurations are designated by the reference letters (b'), (c'), (d'). By comparing FIGS. 4 and 7, it will be noted that, if the positions marked (a) and (a') are identical, the positions marked (b'), (c') and (d') in FIG. 7 differ somewhat from the positions (b), (c) and (d) in FIG. 4. The considerably greater clearance at the level of the sidewall 11 will be noted, said clearance being maintained and permitted by the cam control means.

Due to the cam control, the relative movement between the second and third arms may be fairly freely conformed to requirements since it depends essentially on the profile of the cam. The constraints of proportionality with regard to the relative rotary movement between the first and second arms, specific to the belt control described with reference to FIGS. 3 and 5, are thus removed. It is possible to impose a relative position of the third arm with regard to the second arm, in particular in order to disengage the eyelet 6 rapidly with respect to the core 1. In this way, a constantly sufficient clearance is ensured between the conveying head $33T^{1c}$ and the core 1 (see positions 6b, 6c and 6d) while moving sufficiently close to the surface of the core 1 in the bead zone (see position 6a). On the cam $381^{1c}$, it may be noted that the part $381B^{1c}$, and the part $381D^{1c}$ deflected in the other direction, impose considerable changes in position over only a short distance, i.e. rapid changes in position (travel being in a curvilinear x-direction along the cam $381^{1c}$), to tilt the third arm $33^{1c}$ respectively to one side and the other of the second arm $321^{1c}$, at the opposite ends of the movement of the eyelet 6, when it approaches each of the beads.

Returning to FIG. 1, the following comment explains a specific aspect of the present invention, which may be applied not only to all the embodiments described here, in all the variants thereof, but also to other depositing members as indicated above in connection with above-cited patent. It is possible to impart an alternating movement to the actuating mechanism support (such as the plate $30^{1a}$) with the purpose of deflecting the final trajectory of the cord 4 on the core 1. It is possible, for example, to actuate the plate $30^{1a}$ with an alternating translational movement (see double arrow P), allowing translation of the plane of movement in a direction perpendicular to the plane of movement. It is also possible to actuate the depositing member support with an oscillatory movement about a geometric axis perpendicular to the surface of the form, included in the plane of movement and intersecting the geometric axis of rotation of the base arm (see double arrow Q about the axis M—M of FIG. 1), allowing oscillation of the eyelet plane of movement about said axis M—M. It is also possible to actuate the depositing member support with an oscillatory movement about any axis parallel with the previous one. It is important to distinguish such a design from simple fixed adjustment (also possible and useful in certain cases) of the angle which the plate $30^{1a}$ forms about the axis MM. The movements described here provide an additional degree of freedom for acting on the exact shape of the trajectory of the cord 4, which is advantageous in itself.

Figure 8:
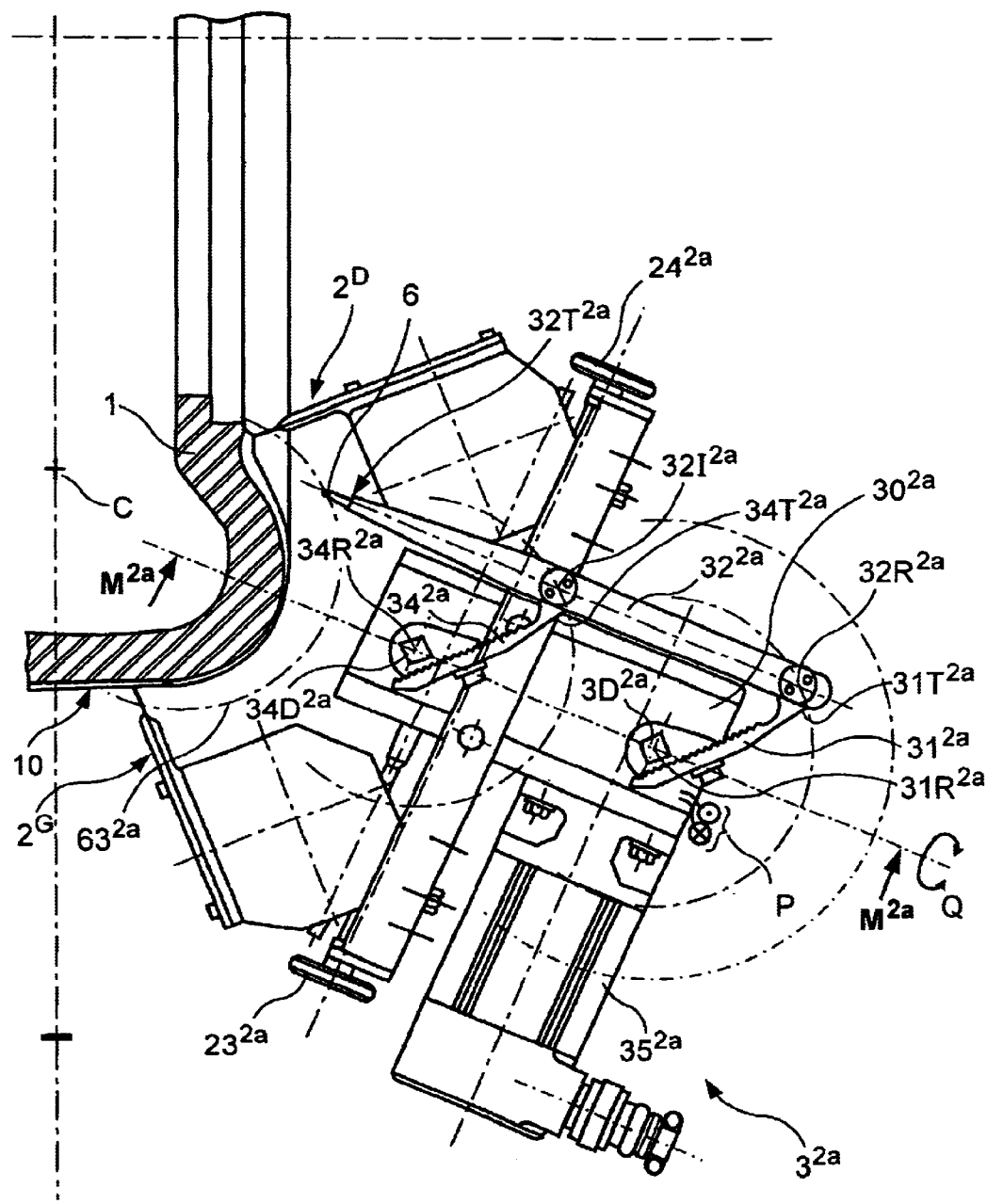
FIG. 8 is a radial section showing a second embodiment of an apparatus, showing schematically a second exemplary embodiment of the invention.
Figure 9:
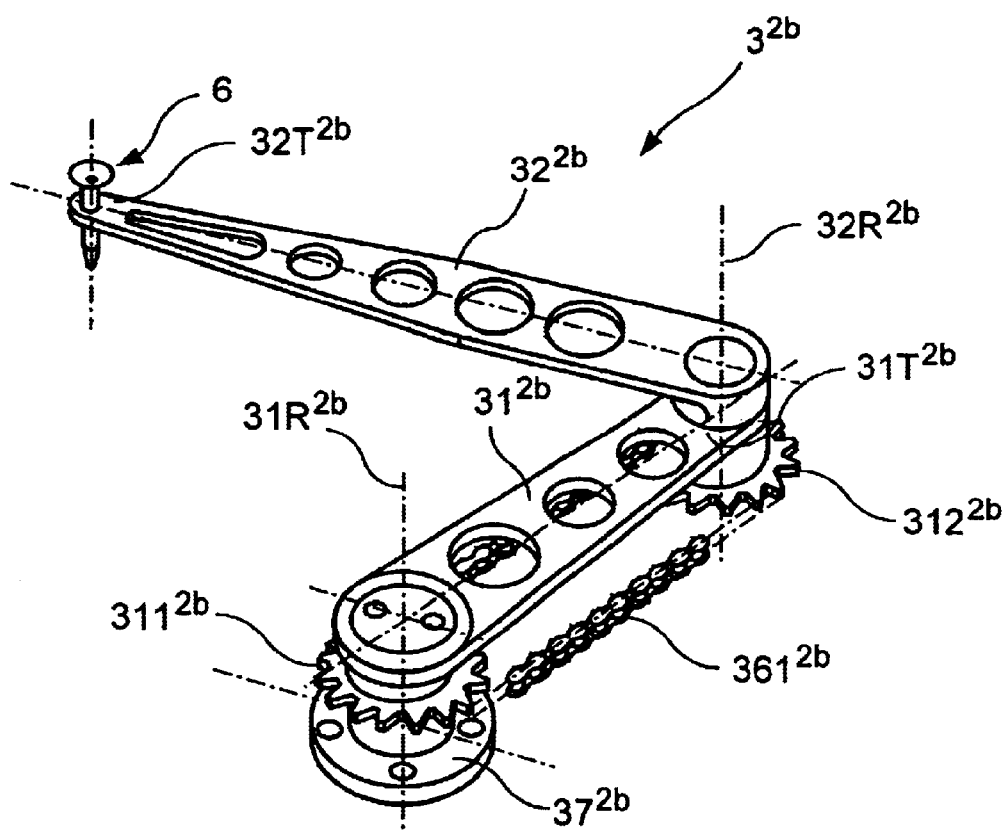
FIG. 9 illustrates a variant of the second embodiment of the apparatus.

In a second embodiment, illustrated in FIGS. 8 and 9, the system of oscillating arms $3^{2a}$ comprises two functional oscillating arms $31^{2a}$ and $32^{2a}$ in series. It is designed for operation from a bead to a shoulder, for example for manufacture of a half-carcass. It is known, in effect, that the carcass of a radial tire may be discontinuous from one bead to the other, being interrupted somewhere under the tread, the belt reinforcement ensuring the transmission of forces between the half-carcasses. The carcass reinforcement must be deposited between the bead and a shoulder. The oscillating arm system $3^{2a}$ adopts the parallelogram principle used in the oscillating arm system $3^{1a}$, except that, of course, there is no third arm. A plate $30^{2a}$ supports a control motor $35^{2a}$. The control motor $35^{2a}$ actuates shafts $3D^{2a}$ and $34D^{2a}$, the geometric axis of rotation of which is included in a median plane $M^{2a}$—$M^{2a}$. The control motor $35^{2a}$ also actuates the presser devices $2^G$ and $2^D$, these being of the same type as those described in more detail in relation to FIG. 2. The spacing of the presser devices $2^G$ and $2^D$ relative to the median plane $M^{2a}$—$M^{2a}$ may be adjusted by the wheels $23^{2a}$ and $24^{2a}$.

A base arm (or first arm) $31^{2a}$ is mounted on the oscillating shaft $3D^{2a}$, via its center of rotation $31R^{2a}$. Taking as the reference point the center C of the radial section of the core 1, the center of rotation $34R^{2a}$ is situated externally of the surface of the core 1. The first arm $31^{2a}$ comprises a conveying head $31T^{2a}$. A second arm $32^{2a}$, articulated by a center of rotation $32R^{2a}$ of the second arm, is mounted on the conveying head $31T^{2a}$ of the first arm $31^{2a}$. This second arm $32^{2a}$ comprises a conveying head $32T^{2a}$. So as to control the relative position of the second arm $32^{2a}$ relative to the first arm $31^{2a}$, in this example a parallelogram is formed by means of an auxiliary arm $34^{2a}$, mounted oscillatingly about the oscillating shaft $34D^{2a}$ via the center of rotation $34R^{2a}$ thereof. Taking as the reference point the center C of the radial section of the core 1, the center of rotation $34R^{2a}$ is situated externally of the surface of the core 1, between the latter and the center of rotation $31R^{2a}$ of the first arm $31^{2a}$. The auxiliary arm $34^{2a}$ comprises a conveying head $34T^{2a}$, articulated to the second arm $32^{2a}$ which comprises to this end an intermediate center of rotation $32I^{2a}$ situated between the center of rotation $32R^{2a}$ and the conveying head $32T^{2a}$ of said second arm $32^{2a}$. The conveying head $32T^{2a}$ of the second arm $32^{2a}$ directly supports the eyelet 6. The movement of the eyelet 6 is shown by the axis line $63^{2a}$.

An apparatus according to this principle, with two functional oscillating arms, could just as well be used for operation from a bead as far as any point under the tread, including as far as the opposing shoulder, with a certain degree of overlap between the half-carcasses.

FIG. 8 also shows, by means of the arrows P pointing perpendicularly to the plane of the Figure, that it is possible to impart an alternating movement to the actuating mechanism support (such as the plate $30^{2a}$) with the purpose of deflecting the actual final trajectory of the cord 4 on the core 1. It is possible, for example, to actuate the plate $30^{2a}$ with an alternating translational movement, allowing translation of the plane of movement in a direction perpendicular to the plane of movement. It is also possible to actuate the plate $30^{2a}$ with an oscillatory movement about a geometric axis included in the plane of movement and intersecting the geometric axis of rotation of the base arm (see double arrow Q about the axis M—M of FIG. 8), or indeed about any axis parallel to the above, allowing oscillation of the plane of movement about said axis M—M. It is important to distinguish such a design from simple fixed adjustment (also possible and useful in certain cases) of the angle which the plate $30^{2a}$ forms about the axis $M^{2a}$—$M^{2a}$. The movements described here provide an additional degree of freedom for acting on the exact shape of the trajectory of the cord 4, which is advantageous in itself.

FIG. 9 shows a variant comprising a system of oscillating arms $3^{2b}$, differing from that described in relation to the system of FIG. 8 essentially in the means of controlling the movement of the second arm $32^{2b}$ with regard to the base arm (or first arm) $31^{2b}$. Instead of a control means comprising toothed pulleys and belts, this variant comprises a drive pinion $311^{2b}$ centered on the center of rotation $31R^{2b}$ of said first arm.

The Figure shows a base arm (or first arm) $31^{2b}$ mounted on an oscillating shaft via its center of rotation $31R^{2b}$. The first arm $31^{2b}$ comprises a conveying head $31T^{2b}$ at the opposite end from the center of rotation $31R^{2b}$. A second arm $32^{2b}$, articulated by a center of rotation $32R^{2b}$ of the second arm, is mounted on the conveying head $31T^{2b}$ of the first arm $31^{2b}$. This second arm $32^{2b}$ comprises a conveying head $32T^{2b}$, on which the eyelet 6 is directly mounted. The drive pinion $311^{2b}$ is firmly connected with a flange $37^{2b}$ mounted fixedly on a plate (not shown in FIG. 9). A driven pinion $312^{2b}$ is firmly connected (that is to say without the possibility of any relative rotation) to the second arm $32^{2b}$. A chain $361^{2b}$ connects said first and second pinions. The diameters of the first and second pinions are identical so that, during movement thereof, the second arm $32^{2b}$ always remains parallel to itself. The arm system $3^{2b}$ may replace the arm system $3^{2a}$ of FIG. 8. The above comment about the possibility of controlling a degree of freedom between the plate and the flange $37^{1b}$ and controlling the relative position of said flange $37^{1b}$ relative to the plate also applies to the flange $37^{2b}$, as well as to all similar flanges.

It should be remembered that the eyelet 6, in all the variants, is actuated with a cyclical movement in a plane, designated above as "eyelet movement plane". Moreover, the pre-coated surface of the core 1 determines the overall geometry of the surface on which the reinforcing cord 4 is deposited. Furthermore, the core 1 is driven rotationally about its axis while the eyelet 6 performs its to-and-fro movements in the eyelet movement plane. Of course, the movement of the core 1 is synchronized with the to-and-fro movement of the eyelet. The true trajectory of the arches 40 of the cord 4 is thus both a function of the relative position between the eyelet movement plane and the core and a function of the relative movement between the core 1 and the to-and-fro movement of the eyelet 6.

In FIGS. 1, 4, 7 and 8, the trajectory of the arch 40 is substantially radial, because said Figures apply to the production of a carcass (or a half-carcass) for a radial tire, without this being limiting, of course. Another example is given in a third embodiment, illustrated in FIG. 12, where the trajectory of the arch $40^{3a}$ is not radial but rather forms an angle typical of belt reinforcements (of the order of 15° to 30°). It is also possible to actuate the plate $30^{3a}$ (actuating mechanism support) with an oscillatory movement about a geometric axis perpendicular to the surface of the form, included in the plane of movement and intersecting the geometric axis of rotation of the base arm (see double arrow Q about the axis M—M of FIG. 12), or indeed about any axis parallel to the above, allowing oscillation of the plane of movement about said axis MM. This oscillatory movement of the plane of movement provides an additional degree of freedom for acting on the exact shape of the trajectory of the arch $40^{3a}$, for example so that the trajectory of the arch forms an "S", for example so that the value of the angle is greater at the shoulders than at the center of the tread, which is advantageous in itself.

Figure 12:
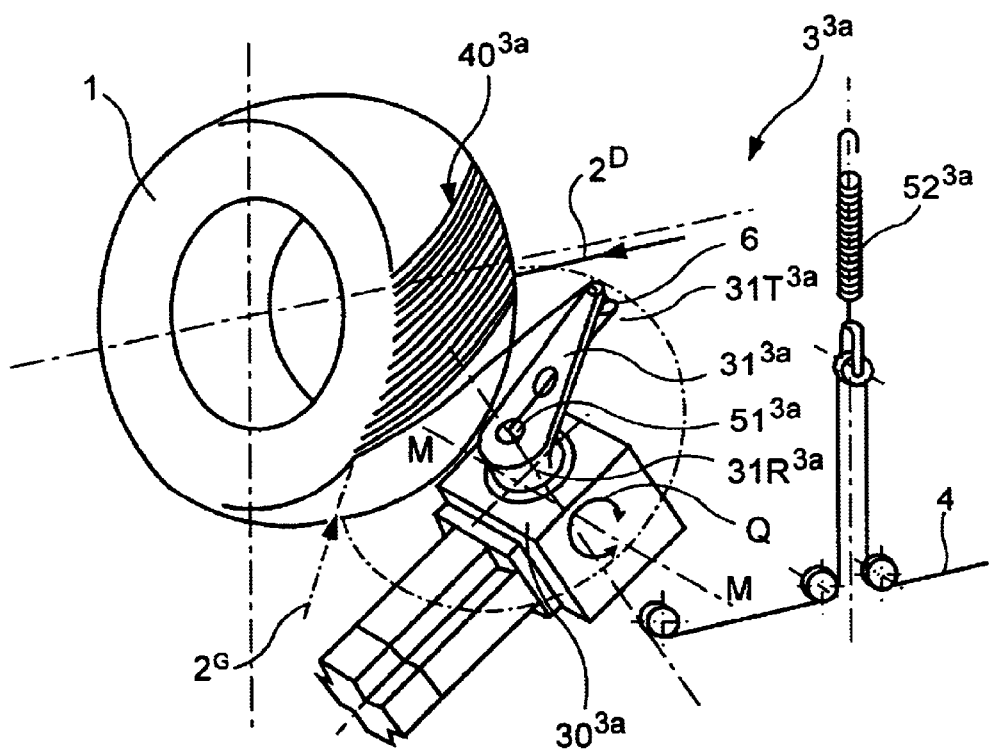
FIG. 12 is a schematic perspective view showing a third exemplary embodiment of an apparatus according to the invention.

In this third embodiment shown in FIG. 12, a system is disclosed which comprises a single functional oscillating arm (the base arm) $31^{3a}$, adapted for example to the production of reinforcements in the belt of a tire. It is adapted, for example, to shoulder to shoulder operation, to produce belt reinforcements. The base arm $31^{3a}$ is mounted on an oscillating shaft $3D^{3a}$ via its center of rotation $31R^{3a}$. The base arm $31^{3a}$ comprises a conveying head $31T^{3a}$, to which an eyelet 6 is directly attached. The deposition plane in which the eyelet 6 describes its to-and-fro movement forms an angle of the order of 20° relative to a plane perpendicular to the axis of rotation of the core 1, according to the conventions usual for measuring angles in the tire sector. The presser devices $2^G$ and $2^D$ act in the same deposition plane. Among the details visible in FIG. 12 which are not specific to this embodiment, it should be noted that the cord 4 is passed through the hollow center $51^{3a}$ of the oscillating shaft $3D^{3a}$ and that a large return capacity compensation system $52^{3a}$ is installed upstream.

To produce a carcass with cross-ply in the sidewalls, the eyelet plane of movement may be changed from a purely radial orientation, by inclining the depositing member support (such as the plate 30) about an axis parallel to the axis of rotation of the core 1. It is of course possible to combine this adjustment with that applied in the above paragraph illustrating the production of belt reinforcements. It is also possible, without changing any features of the members of the apparatus as described, to drive the core at a relatively high speed, for example ⅛ of a revolution per to-and-fro movement of the arm system 3, in such a way that a cord laying angle is obtained which is a function of the relationship between the speed of the chain and the speed of the core (whereas in all the preceding examples the speed of the core 1 affected only the laying pitch).

Figure 13:
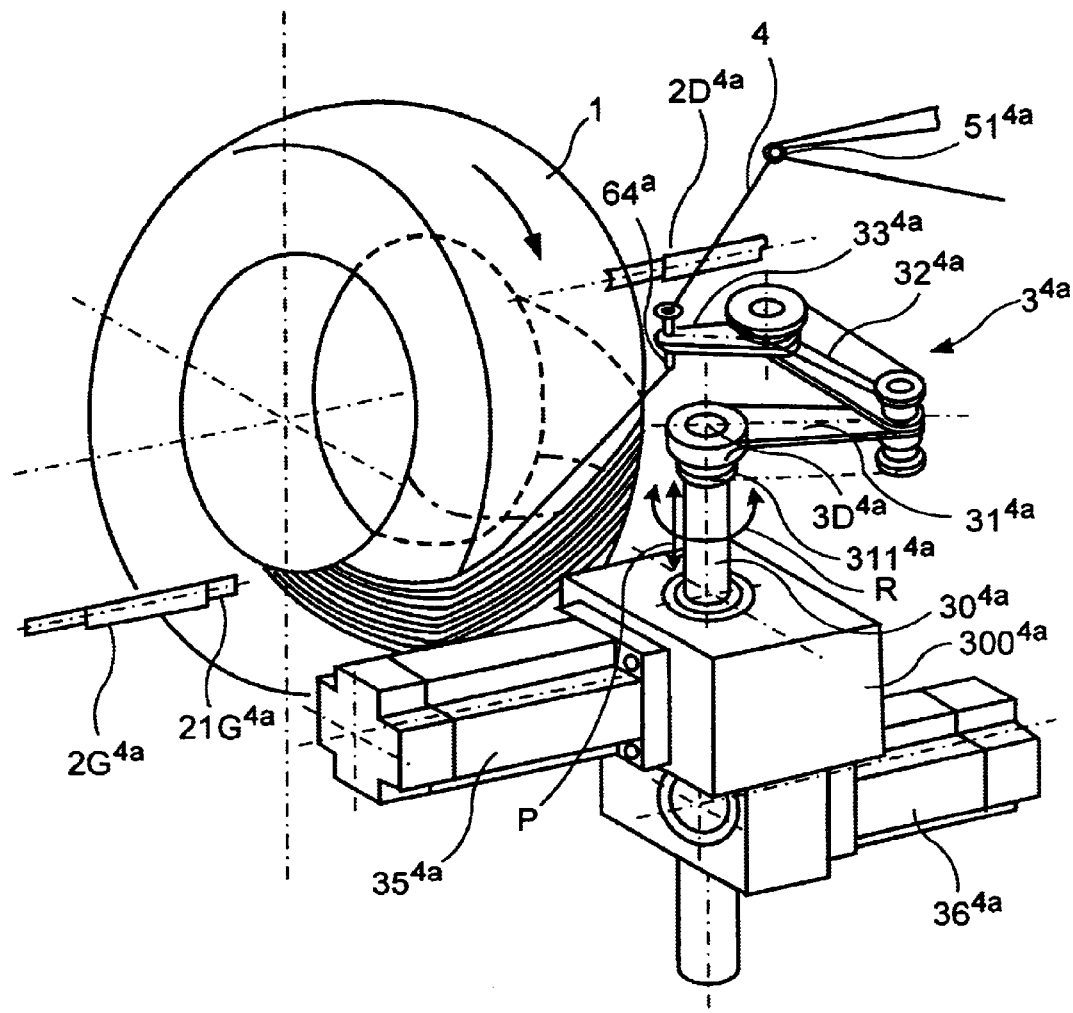
FIG. 13 is a schematic perspective view showing a fourth exemplary embodiment of the invention.

FIG. 13 shows an apparatus very similar to that of FIG. 3. The system of oscillating arms $3^{4a}$ comprises three functional oscillating arms $31^{4a}$, $32^{4a}$, $33^{4a}$ arranged in series. The cord 4 is supplied to the oscillating arm system $3^{4a}$ by a suitable presentation device $51^{4a}$. An eyelet $6^{4a}$ is mounted on the last $33^{4a}$ of the oscillating arms. The first $31^{4a}$ of the oscillating arms is mounted on an oscillating shaft $3D^{4a}$. The shaft $3D^{4a}$ is mounted in a tube $30^{4a}$, itself mounted slidingly but non-rotatingly on a plate $300^{4a}$. For more details about the actuating mechanism, the reader should refer to FIG. 3 and the corresponding paragraphs. It should simply be pointed out that a drive pulley $311^{4a}$ is firmly connected with the tube $30^{4a}$. A motor $35^{4a}$ controls movement of all the arms $31^{1a}$, $32^{1a}$, $33^{1a}$ by making the oscillating shaft $3D^{4a}$ describe oscillations "R". A motor $36^{4a}$ imposes on the tube $30^{4a}$ alternating translational movements "P" over a predetermined course. The oscillations "R" and translational movements "P" are synchronous and in phase. In this way, the eyelet $6^{4a}$ describes a movement which is a combination of the movements imposed by the motors $35^{4a}$ and $36^{4a}$. Presser devices $35^{4a}$ and $36^{4a}$ are fitted at azimuths offset as a function of the extent of the translational movement "P". It may be seen that it is thus possible to deposit on the core 1 a cord 4 forming a non-radial trajectory in the sidewalls and differing from 90° under the tread. In practice, numerous trajectory deflection variants may be performed with this variant embodiment. For instance, on could control motors $35^{4a}$ et $36^{4a}$ in order that the trajectory of the arch deposited on the form be substantially radial in the sidewalls and forms an angle very different than 90° under the tread. One could lay down two such reinforcements while crossing the arches under the tread.

The invention may also be applied to the apparatus described in U.S. Pat. No. 5,453,140. An actuating mechanism designated by the reference numeral "5" in FIG. 1 consists essentially of a curved tube "17". It appears that the travel of the cord at its end "21" describes a movement in a plane of movement. The tube "17" is mounted of necessity on a support, for example by bearings shown without reference numerals. Application of the present invention to this apparatus consists in imparting to the support the appropriate alternating movement, synchronized with the cyclical movement of the actuating mechanism, as explained above.

An advantage of the invention is that the apparatus thus performing the previously known basic process is mechanically simple and light and that this apparatus involves at most only adjustments which are simple to perform for adaptation to all the tire reinforcement variants to be produced, covering the widest possible range of tires. The system of oscillating arms exhibits little protrusion, little inertia and lends itself well to elevated operating speeds.

It is possible to produce a carcass reinforcement in several (n) depositing passes, each pass covering the entire core. Since the radial arches within one pass are laid down at a pitch P, the position on the core 1 of the arches 40 deposited during n successive passes may thus exhibit a circumferential phase shift corresponding to P/n. The person skilled in the art may also foresee a plurality of ways of using the invention, depending on the tire architecture which it is desired to obtain.

It should also be pointed out that, in the case of the production of half-carcasses (see FIGS. 8 and 9), it is possible to produce each of the half-carcasses simultaneously each side of the core, by providing two apparatus according to the invention, each opposite one side of the core. Or it is possible to produce each of the half-carcasses in succession.

An advantage of the present invention is that it allows passage round the form in numerous instances of use, including ones in which the trajectory of the arches forms an angle very different from 90° (for example of the order of 20°). Even in this instance, it is also possible to reach two points of the form in succession, each in the zone corresponding to a tire bead, without the risk of striking the form.

I claim:

1. An apparatus for manufacturing a tire reinforcement constituted from a cord supplied continuously and on demand by a suitable distributor, said apparatus being intended for use in cooperation with a substantially toroidal form on which said reinforcement is built up progressively by depositing arches of said cord according to a desired trajectory for said cord on the surface of said form, said apparatus comprising:

depositing members arranged on a support wherein said depositing members comprise:
(i) a guide member in which the cord may slide freely and
(ii) a mechanism for actuating said guide member in a plane of movement so as to bring said guide member in successive oscillations from one end of said cord trajectory to the other end of said cord trajectory, pressers arranged at said ends of said cord trajectory for applying the cord onto the form, means of imparting to said support an alternating movement perpendicular to the plane of movement of said guide member and wherein said alternating movement is synchronized with the movement of the guide member so as to allow deflection of the final cord trajectory.

2. The apparatus of claim 1, wherein said actuating mechanism comprises a base arm and means of imparting to said base arm an oscillatory movement about a center of rotation of said base arm;

wherein said base arm comprises a conveying head; and
wherein said conveying head conveys the guide member from one end to the other of said trajectory.

3. The apparatus of claim 2 further comprising a second oscillating arm and an auxiliary arm;

wherein the center of rotation of said second arm is mounted at the conveying end of said base arm;
wherein said second arm has a conveying head;
wherein said conveying head of said second arm conveys said guide member from one end to the other of said trajectory;
wherein the geometric axis of rotation of said auxiliary arm is remote from the axis of rotation of said base arm;
wherein said auxiliary arm has a conveying head;
wherein said second arm has an center of rotation intermediate between the center of rotation of said second arm and said conveying head of said second arm; and
wherein said intermediate center of rotation is articulated on said conveying head of said auxiliary arm.

4. The apparatus of claim 3, wherein said conveying head of said second arm directly supports said guide member.

5. The apparatus of claim 2 further comprising:

a second oscillating arm;
wherein the center of rotation of said second arm is mounted on said conveying head of said base arm;
wherein said second arm has a conveying head;
means of controlling the position of said second arm relative to the position of said base arm;
a third oscillating arm articulated by its center of rotation to said conveying head of said second arm;

wherein said third arm has a conveying head, wherein said conveying head of said third arm conveys said guide member from one end to the other of said trajectory; and means of controlling the position of said third arm relative to the position of said second arm.

6. The apparatus of claim 5, wherein said conveying head of said third arm directly supports said guide member.

7. The apparatus of claim 1, wherein said actuating mechanism comprises a chain;

wherein said chain is mounted in a guide circuit;

wherein said guide member comprises a pivoting eyelet;

wherein said eyelet is mounted on said chain;

wherein said cord passes through said eyelet; and wherein the pivot axis of said eyelet is perpendicular to the plane of said guide circuit.

8. A process for manufacturing a tire reinforcement constituted from a cord supplied continuously and on demand by a suitable distributor, using a substantially toroidal form on which said reinforcement is built up progressively by depositing arches of the cord according to a desired trajectory for the cord on the surface of said form, and using an apparatus comprising depositing members arranged on a support wherein said depositing members comprise:

(a) a guide member in which the cord may slide freely and (b) a mechanism for actuating said guide member in a plane of movement so as to bring said guide member in successive oscillations from one end of said cord trajectory to the opposite end of said cord trajectory, said process comprising:

(i) actuating the form with rotation at a speed which is not zero;

(ii) moving the guide member in a first direction in said plane of movement to a first end of said cord trajectory;

(iii) applying the cord to the form at said first end by means of a first presser;

(iv) holding said cord to said form at said first end;

(v) actuating said support in synchronism with the movement of said guide member so as to deflect the final cord trajectory;

(vi) moving said guide member in a direction opposite to said first direction to a second end of said cord trajectory;

(vii) applying the cord to the form at said second end by means of a second presser device;

(viii) holding said cord to said form at said second end;

(ix) actuating said support in synchronism with the movement of said guide member so as to deflect the final cord trajectory;

(x) repeating steps ii to ix until the desired number of arches is deposited on the surface of the form.

9. The process of claim 8, wherein the speed of rotation of said form is constant.

* * * * *